May 20, 1952  JEAN-RENÉ H. DUTILH  2,597,088
MULTICHANNEL TELEMETERING DEVICE
Filed May 8, 1950  2 SHEETS—SHEET 1

INVENTOR:
JEAN RENÉ H. DUTILH
By Wendtroth, Lind + Ponack
ATTORNEYS

May 20, 1952     JEAN-RENÉ H. DUTILH     2,597,088
MULTICHANNEL TELEMETERING DEVICE
Filed May 8, 1950     2 SHEETS—SHEET 2

INVENTOR:
JEAN RENÉ H. DUTILH
By Wenderoth, Lind & Ponack
ATTORNEYS

Patented May 20, 1952

2,597,088

UNITED STATES PATENT OFFICE 2,597,088

MULTICHANNEL TELEMETERING DEVICE

Jean-René H. Dutilh, Paris, France

Application May 8, 1950, Serial No. 160,771
In France May 10, 1949

6 Claims. (Cl. 177—351)

The present invention relates to a telemetric system comprising a plurality of transmitters associated with one single central receiver adapted to be connected through two-wire lines of any individual length to each respective transmitter, and in which system the variable quantity to be transmitted is represented, in each transmitter, by the value of a given resistance.

Some systems of this type are known (cf., e. g., U. S. Patent No. 2,232,288 of February 18, 1941 by Mr. F. F. Uelhing, and French Patent No. 764,130 of April 11, 1943 by Cyril Midworth) in which the variable quantity to be transmitted is represented, in the transmitter, by the ratio of two resistances, and wherein a different channel is assigned to each alternance of an alternating current, one alternance passing through one of said resistances, and the next alternance passing through the other resistance. These systems are fed with a constant alternating voltage, and the variable quantity to be transmitted is represented, in the receiver, either by the ratio of alternative currents of each alternance, or by the difference of these currents.

In these systems the current of each alternance depends not only on the particular resistance it runs through, but also on the resistance of the line connecting the transmitter to the receiver. Each current of a given alternance is inversely proportionate to the sum of the measurement resistance it runs through and of the line resistance. Thus the measured value, whether it is obtained by taking the ratio, or the sum of the two currents of opposite polarities is in both cases depending on the resistance of the line. Therefore the line resistance must be taken into account for rating of the system, and for this reason such systems cannot be used to connect, turn by turn, several transmitters to the same central receiver.

The object of the present invention is to provide for a telemetric system of the same type as above, but in which the measurement of a resistance gauge would be independent of the line resistance, even in the case where the latter is much greater than the maximum value which the resistance gauge can take.

Another object of the present invention is to provide for a central telemetric receiver adapted to be connected, turn by turn, and without any adjustment, to several transmitters located at unequal distances.

The method according to the invention consists in sending from the transmitter to one of the receivers connected thereto at the considered moment, successive current pulses of equal amplitude, but of alternating polarity fed by a constant current generator, in providing each transmitter with unidirectional channels such that the current of a given polarity runs through the resistance representing the variable quantity to be transmitted, whereas that of the opposite polarity passes through short-circuiting means leaving aside said resistance, and then in measuring, by means of an apparatus like voltmeter, the difference of voltages energised at the terminals of the receiver by each of the currents of opposite polarities.

The voltmeter can be situated either beyond the invertor of the polarity, with respect to the constant current generator, or between the generator and the invertor.

In the first case the two voltages energised by the currents of opposite polarities are of opposite sense. If the duration of the positive pulses of the current is the same as the duration of negative pulses, the voltmeter will measure a mean value of these voltages which is proportionate to the resistance to be measured.

In the second case the two voltages are of the same polarity, and the voltmeter must measure the difference of said voltages. To this effect one of the voltages is stocked in a condenser, and the other is measured by putting in a serial connection with terminals of the voltmeter said condenser in inverting its armatures.

The invention will be described hereunder with reference to several examples of embodiments. This description will be made with reference to the accompanying drawings in which:

Figure 1 represents a telemetric system in which the means of unidirectional passage of the current to the transmitter are embodied by a polarised relay.

Figure 2 gives an example of a constant current generator;

Figure 4:
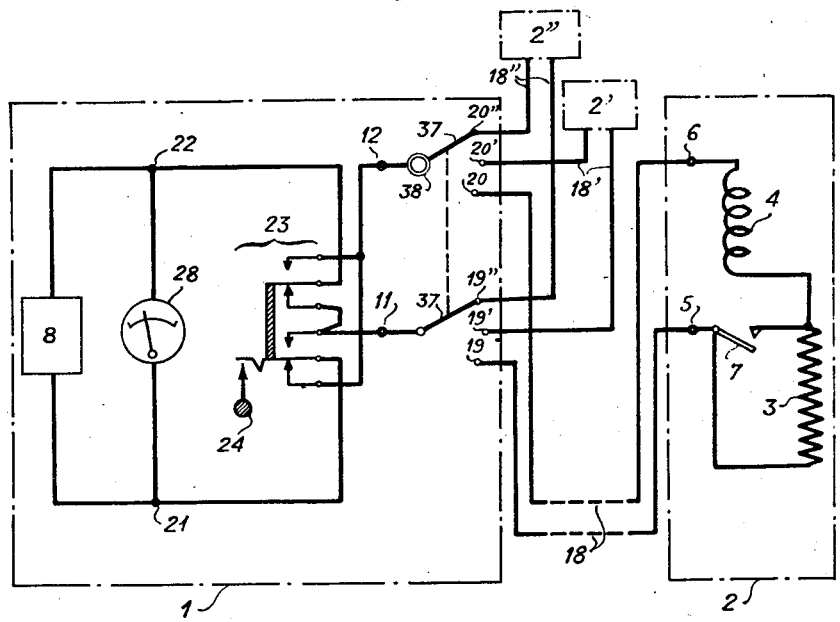
Figure 4 is a variant arrangement of Figure 1 and in which the voltmeter is located between the constant current generator and the invertor of polarity.
Figure 5:
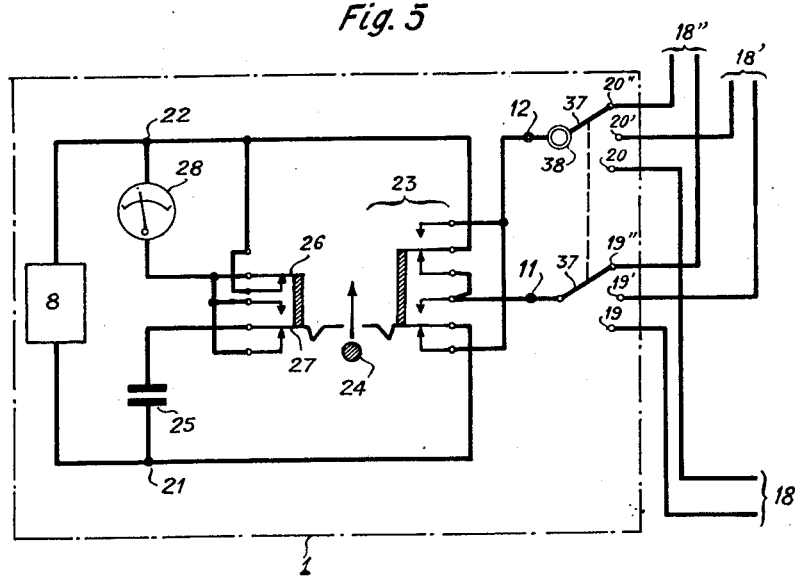

Figure 5 gives diagrammatically the voltmeter circuit in the variant arrangement of Figure 4.

Figure 1:
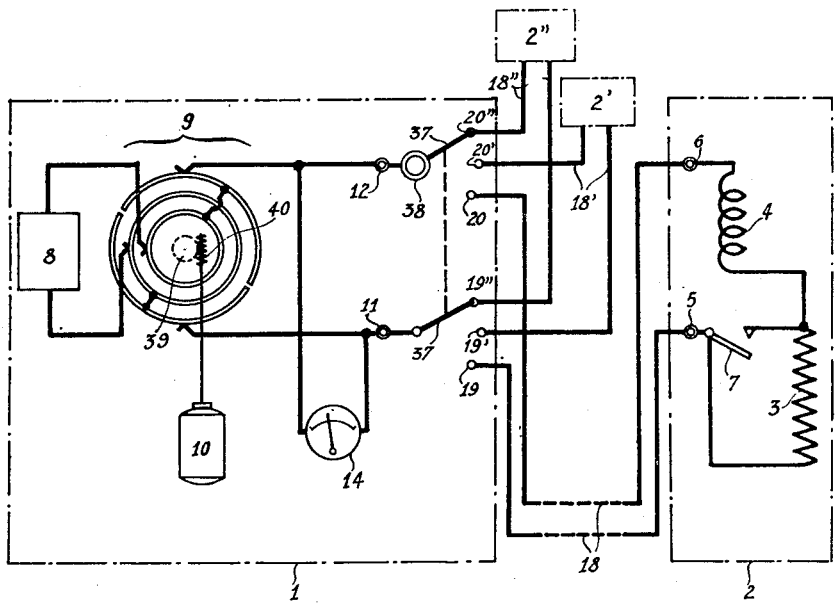

In Figure 1 is represented in I the central receiver and in 2 one of the transmitters.

The resistance 3 to be measured may be a gauged resistance or a potentiometer which is in a serial connection with the windings controlling a polarised relay 4, and which is inserted between the terminals 5 and 6 of the line 18 connecting the transmitter 2 to the receiver 1.

Each transmitter such as 2 is connected to the central receiver 1 by a two-wire line such as 18. Three transmitters 2, 2' and 2" connected by the lines 18, 18' and 18" are represented in the figure. These lines lead to the terminals 19—20, 19'—20', 19"—20" of a rotary commutator the mobile arms 37 of which can be operated manually by means of a milled head knob 38. In each of their respective positions the mobile arms connect the input terminals 11—12 of the central receiver 1 to one of the head lines 18, 18' or 18".

In the receiver circuit, 8 denotes a generator which feeds a constant current $I_0$, and 9 denotes a rotary invertor driven at a constant velocity by a motor 10. The motor 10 drives the invertor 9 by means of a pinion 39 and of an endless screw 40. The object of this invertor is to invert, at regular intervals, the sense of the current $I_0$ fed to the line between the points 11 and 12. A voltmeter 14 inserted between 11 and 12 records the mean value of the voltage between these two points.

The constant current generators are very well known in the technics. For the sake of completeness such a generator has been represented in Figure 2. It comprises a pentode tube 31 of the type 6J7 the grid 32 of which is polarised by the cathode resistance 33 of some 3,000 ohms. The plate is brought to a potential of 250 volts by a battery 34 through the load resistance of a few thousands ohms introduced between 11 and 12 and formed by the line 18 and the receiver 2. The screen 36 is brought to a potential of 100 volts by a battery 35. Under these conditions a current of approximately 4 milliamperes is collected between 11 and 12.

Be $\pm I_0$ the constant current running through the line; when $I_0$ has a negative value, the relay closes the contact 7 which short-circuits the resistance 3; when $I_0$ has a positive value, the contact switch is opened.

Be $R_L$ the line resistance, $R_R$ the resistance of the relay 4, and $R_x$ the value of the resistance 3.

During the positive alternance we shall have, denoting by E the voltage between 11 and 12:

$$E_1 = I_0(R_L + R_R + R_x)$$

during a negative alternance we shall have:

$$E_2 = -I_0(R_L + R_R)$$

If the time constant of the voltmeter is great as compared with the pulse periods, the voltmeter will show a mean figure of these two values, viz.:

$$E = \frac{1}{2} I_0 R_x$$

The reading of the voltmeter will be thus proportionate to the value of the resistance to be measured, and it will be independent both from the relay resistance and from the line resistance.

Figures 2, 3:
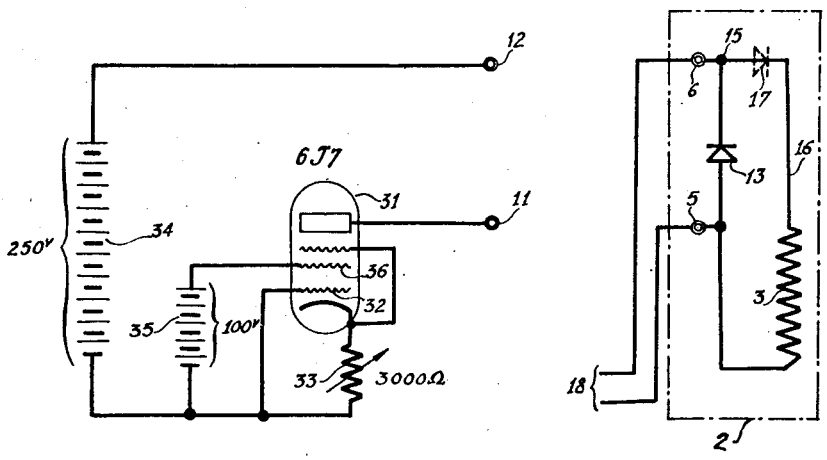
Figure 3 represents a telemetric system in which the means of unidirectional passage of the current to the transmitter are embodied by rectifiers.

In the embodiment of Figure 3 the measuring set comprises simply a dry rectifier 13 and the resistance 3 to be measured, connected in a parallel arrangement between the terminals 5 and 6 of the line. It is assumed that, for negative alternances, the rectifier has an impedance negligible as compared with $R_x$, and, during positive alternances, a considerable impedance as compared with $R_x$.

Under these conditions the resistance measured between 5 and 6 will be practically zero, if $I_0$ is negative, and practically equal to $R_x$, if $I_0$ is positive.

We shall have then:

$$E_1 = I_0(R_L + R_x) \text{ if } I_0 \text{ is positive}$$

and:

$$E_2 = -I_0 \cdot R_L \text{ if } I_0 \text{ is negative}$$

wherefrom we finally deduce:

$$E = \frac{1}{2} I_0 \cdot R_x$$

as in the foregoing case.

The foregoing computation does not take into account the counter-electromotive force of the dry rectifier 13. It would be possible to eliminate the errors due to this counter-electromotive force by providing, between the points 15 and 16, a rectifier 17 identic to the rectifier 13, but operative in the opposite direction. This rectifier 17 is drawn in a dashed line in Figure 3.

In the systems illustrated in Figures 1 and 3 the accuracy of the measurements depends obviously on the accuracy obtained in making equal, both in amplitude and in duration, the positive and the negative current pulses; usually a high precision equipment is necessary to obtain this equality.

In the systems which will be described hereunder the accuracy of the measurements is not affected by unequal duration of constant current pulses.

In Figure 4 is represented in 1, as heretofore, the receiver, and in 2 the measurement set. This latter is similar to that of Figure 1. In the receiver the voltmeter is situated before the invertor of the current's polarity, and not after the same, as in the preceding circuits.

The receiver comprises a constant current generator 8, and an invertor 23 operatable by a two-way switch 24. The purpose of this invertor is to enable, by means of the switch 24, to invert the sense of the current fed to the line between the points 11 and 12. In the rest position of the switch the current flows in a negative sense.

The voltmeter 28, the current consumption of which is negligible as compared with $I_0$, is connected to the output terminals 21 and 22 of the generator 8.

The voltage between the points 21 and 22 amounts to:

$$E_1 = I_0(R_L + R_R)$$

when the switch is in its rest position (negative current) and to:

$$E_2 = I_0(R_L + R_R + R_x)$$

when the switch is in its working position (positive current).

The variation of the voltage:

$$\Delta E = E_2 - E_1$$

equals thus to: $I_0 R_x$; it is easy to deduce therefrom:

$$R_x = \frac{\Delta E}{I_0}$$

In order to facilitate the measurement of $\Delta E$, the compensation of the voltmeter 28 is adjusted manually or automatically in such a manner as to bring its reading to zero when the switch 24 is in its rest position what corresponds to closing of the contact 7. The reading of the scale of 28 when the switch is turned to the working position gives then a measure proportionate to $R_x$.

In Figure 5, besides the members already described above, one has represented in 25 a capacity and in 26 and 27 two additional commutation contacts actuated by the same switch 24 which controls the invertor. The role of these commutation contacts is as follows:

In the rest position of the switch 24 (corresponding to the closed position of the contact 7) to short-circuit the voltmeter 28 and to introduce in the circuit the capacity 25 between the terminals 21 and 22 of the generator 8. The capacity 25 will be then loaded to the voltage $E_1$ in a time which may be considered as negligible, the load circuit comprising no other resistances but that of the source 8;

In the working position (corresponding to the opened position of the contact 7), to connect in a serial arrangement, between the terminals 21 and 22, the voltmeter and the capacity loaded as above.

Under these conditions the voltage at the terminals of the voltmeter will amount to:

$$\Delta E = E_2 - E_1 = I_0.R_x$$

The invention has been described here-above with reference to some examples. Some modifications concerning certain members may, however, be imagined by the men skilled in the art of these technics, and it is understood that the circuits comprising such modifications enter in the general scope of the present invention.

What I claim is:

1. A multichannel telemetric device comprising in combination a plurality of measuring sets, a plurality of variable resistance gauges located in said measuring sets and having short-circuiting means responsive to the sense of the current flow, a receiving station, a plurality of two wires lines of variable length and resistance connecting said gauges to said receiving station, a constant amplitude direct current generator in said station, said amplitude being independent of the line resistance, an inverter of the direct current polarity, a voltage measurement means adapted to measure the variation of the voltage at the terminals of the generator when the inverter is switched, and switching means for connecting the receiving station terminals to the two wires lines, whereby the voltage variation is proportional to the resistance gauge being connected.

2. A multichannel telemetric device comprising in combination a plurality of measuring sets, a plurality of variable resistance gauges located in said measuring sets, and each having a polarized relay winding in serial connection, a blade in said relay being adapted, when energized, for short-circuiting the corresponding resistance gauge, a receiving station, a plurality of two wire lines of variable length and resistance connecting said gauges to said receiving station, a constant amplitude direct current generator in said station, said amplitude being independent of the line resistance, an inverter of the direct current polarity, a voltage measurement means adapted to measure the variation of the voltage at the terminals of the generator when the inverter is switched, and switching means for connecting the receiving station terminals to the two-wire lines, whereby the voltage variation is proportional to the resistance gauge being connected.

3. A multichannel telemetric device comprising in combination a plurality of measuring sets, a plurality of variable resistance gauges located in said measuring sets and each having a rectifier in shunt connection, a receiving station, a plurality of two-wire lines of variable length and resistance connecting said gauges to said receiving station, a constant amplitude direct current generator in said station, said amplitude being independent of the line resistance, an inverter of the direct current polarity, a voltage measurement means adapted to measure the variation of the voltage at the terminals of the generator when the inverter is switched, and switching means for connecting the receiving station terminals to the two-wire lines, whereby the voltage variation is proportional to the resistance gauge being connected.

4. A multichannel telemetric device comprising in combination a plurality of measuring sets, a plurality of variable resistance gauges located in said measuring sets and having short-circuiting means responsive to the sense of the current flow, a receiving station, a plurality of two wire lines of variable length and resistance connecting said gauges to said receiving station, a constant amplitude direct current generator in said station, said amplitude being independent of the line resistance, a condenser connected across the generator terminals, a voltmeter in serial connection with said condenser, an inverter adapted to invert the direct current polarity and simultaneously to short-circuit said voltmeter, the condenser alone being then connected across the terminals of the generator, and switching means for connecting the receiving station terminals to the two-wire lines, whereby the voltage indicated by the voltmeter is proportional to the resistance gauge being connected.

5. A multichannel telemetric device comprising in combination a plurality of measuring sets, a plurality of variable resistance gauges located in said measing sets and having short-circuiting means responsive to the sense of the current-flow, a receiving station, a plurality of two-wire lines of variable length and resistance connecting said gauges to said receiving station, a constant amplitude direct current generator in said station, said amplitude being independent of the line resistance, a voltmeter connected across the terminals of the generator, an inverter of the direct current polarity and switching means for connecting the terminals of the receiving station to the two-wire lines whereby the difference between the voltmeter indications when switching the inverter is proportional to the resistance gauge being connected.

6. A multichannel telemetric device comprising in combination a plurality of measuring sets, a plurality of variable resistance gauges located in said measuring sets and having short-circuiting means responsive to the sense of the current flow, a receiving station, a plurality of two-wire lines of variable length and resistance connecting said gauges to said receiving station, a constant amplitude direct current generator in said station, said amplitude being independent of the line resistance, an inverter of the direct current polarity adapted to give positive and negative direct current during equal periods, a voltmeter connected across the terminals of the inverter, and having a time constant greater than the switching period of said inverter and switching means for connecting the terminals of the receiving station to the two-wire lines, whereby the means indication of the voltmeter is proportional to the resistance gauge being connected.

JEAN-RENÉ H. DUTILH.

REFERENCES CITED

The following references are of record in the file of this patent:

UNITED STATES PATENTS

| Number | Name | Date |
| --- | --- | --- |
| 880,273 | Bristol | Feb. 25, 1908 |
| 2,068,116 | Shotter | Jan. 19, 1937 |
| 2,591,192 | Parr, Jr. | Apr. 1, 1952 |

FOREIGN PATENTS

| Number | Country | Date |
| --- | --- | --- |
| 601,541 | Great Britain | May 7, 1948 |